United States Patent

[11] 3,607,587

[72] Inventor Herbert R. Langkopf
    234 Furstenwall, 4000 Dusseldorf,
    Germany
[21] Appl. No. 763,282
[22] Filed Sept. 27, 1968
[45] Patented Sept. 21, 1971
[32] Priority Oct. 4, 1967
[33] Germany
[31] L 45 737

[54] A CHAIN OF PHOTOGRAPHIC TRANSPARENCY FRAMES CONNECTED TOGETHER BY A FLEXIBLE TAPE
    4 Claims, 2 Drawing Figs.

[52] U.S. Cl. .................................................. 161/39,
    161/44, 161/113, 40/159, 156/304
[51] Int. Cl. ........................................... B32b 3/16
[50] Field of Search........................................... 161/39–40,
    44, 125, 126, 149, 36–38; 111, 114, 18, 113;
    40/152, 158 B, 159; 156/297, 303, 304, 505, 507

[56] References Cited
    UNITED STATES PATENTS
2,277,969  3/1942  Grant .......................... 161/39 X
    FOREIGN PATENTS
921,749  12/1954  Germany ...................... 161/39
714,468   8/1954  Great Britain ................. 40/158 B Primary Examiner—Philip Dier
Attorneys—Charles J. Diller, Charles E. Brown, Vincent L. Ramick and William H. Holt ABSTRACT: This disclosure relates to a chain of photographic transparency frames which are adapted for feeding into a processing machine comprising a plurality of generally rectangular transparency frames arranged in side-by-side and end-to-end relationship with transversely adjacent side-by-side transparency frames being connected to each other by a flexible tape to produce a chainlike effect by being adhered in overlying relationship to marginal side edges of the transparency frames. The flexible nature of the tape permits transversely adjacent transparency frames to be swung, folded or hinged into overlying relationship to each other to encapsulate therebetween an associated photographic transparency, i.e., a photographic negative or the like. The tape preferably includes pressure sensitive or similar adhesive media on the surface thereof opposing the transparency frames, although in another embodiment of the invention both sides of the tape are provided with adhesive to fixedly secure each transparency to an associated frame prior to overfolding transversely adjacent frames into interlocked relationship. In accordance with a further embodiment of the invention each frame includes a "transparency area" inboard of marginal edges of the frame and the tape includes adhesively coated tonguelike projections disposed in the "transparency area" such that each transparency will be fixedly secured in a "transparency area" by the projections.

PATENTED SEP 21 1971  3,607,587

INVENTOR
HERBERT REINHOLD LANGKOPF

BY Mason, Porter, Diller & Brown
ATTORNEYS

A CHAIN OF PHOTOGRAPHIC TRANSPARENCY FRAMES CONNECTED TOGETHER BY A FLEXIBLE TAPE

In conventional machines for mounting photographic film, negatives, etc., to conventional transparency frames it has been the practice to stack the transparency frames in a magazine with the frames lying in stack face-to-face relationship and being fed from the magazine in a serial fashion. Quite obviously, this requires a comparatively complicated mechanism for feeding, receiving, transporting, etc., each individual transparency frame, uniting each frame with an associated transparency, and thereafter associating two frames and a transparency to produce the final "slide" or similar projectable and/or viewable photographic element. Obviously, since magazines of this type require stacking of a plurality of transparency frames, the capacity of the magazines is limited, and more importantly, accurate feeding of each frame and spacing between adjacent fed frames must be maintained to assure subsequent assembly of two frames or frame halves and an associated transparency. Minor deviations result in improperly oriented transparencies with respect to the transparency frames which can be best appreciated by improperly though typically mounted skewed artistic paintings in associated frames.

The present invention is particularly directed to improving the manner in which transparency frames are fed to a machine for uniting two frame halves with an associated transparency and particularly in storing the transparency frames in a space-saving manner. Moreover, in accordance with this invention, the transparency frames when arranged in a chain which will be described more fully hereinafter are introduced accurately and safely into conventional mounting machine and are less processed with little difficulty, malfunctions, and thus with reduced processing machine downtime. Quite obviously, in accordance with the present invention the associated processing machine can be of a more simple arrangement than conventional machines which rely upon stacked-fed transparency frames.

The prior art deficiencies heretofore noted are solved by the present invention by providing a "chain" of interlinked photographic or other similar transparency frames or frame halves which are adapted to be fed to a processing or assembling machine for uniting the frame halves with associated transparencies. The chain is defined by a plurality of transparency frames or frame halves which are connected in side-by-side relationship by a bandlike element or tape which permits the quality of frames to be fed in a uniplanar fashion to the processing machine yet providing space-saving advantages since the flexible nature of the tape permits the chain assembly to be provided to processors in a roll, as opposed to the face-to-face stacking of transparency frames heretofore noted. Thus, each transverse pair of frames constitutes in effect a "link" of the "chain" with longitudinally adjacent pairs being readily separated by simply serving the tape and/or removing the same prior to the final assembly of each pair of transparency frame halves with an associated transparency.

As was heretofore noted, the invention thus has the advantage that the "chain" of the transparency frames and the associated tape may be stored in the form of a roll or, for example, in the form of a stack folded in the known "Leporello" manner and in either case the feeding of the chain is equivalent to that of feeding of the chain is equivalent to that of feeding a ripple of film to a motion picture projection machine. Thus, the chain as it is unwound from the roll is maintained in a flat and uniplanar condition and runs in an endless and continuous fashion into the processing or assembling machine. Obviously, due to the side-by-side interconnection of transversely adjacent frames and the longitudinal connection of all transverse pairs of frames there is no problem as involved in the conventional feeding of individual frames from a stack where lagging and/or feeding of one frame relative to another frame is commonplace, thus avoiding conventional breakdowns and machine downtime which is, of course, undesirable and costly.

In accordance with an embodiment of this invention the tape is preferably pliable and includes at least one adhesively coated surface such that the frames can be attached thereto without any intricate or particular shaping of either the tape or the frames, overflowed preferably the adhesive is selected such that it may be readily peeled from the frames to unite each transverse pair in the absence of the tape although, of course, the tape may be retained in the final assembly of each transverse pair of transparency frames.

In accordance with another aspect of the present invention, the tape carries adhesive which, when the tape is pulled from the transparency frames, leaves a film of adhesive on the frames which maintains the same united and adhesively secures the same to each other when overfolded in the manner heretofore noted. While it is known to provide transparency frames with dabs of an adhesive to accomplish this purpose, at present a separate processing step is necessary to apply such a dab of adhesive to one or both of each pair of transversely adjacent frames, and as is well known any such additional step requires a corresponding processing cost.

In accordance with another embodiment of this invention, the tape or bandlike element includes an adhesive on both sides thereof with the tape either remaining housed between the frames when finally closed or removed therefrom. However, in this case the tape is preferably retained with each pair of frames such that the exposed adhesive provides means for fixedly securing a transparency relative to each pair of transversely adjacent frames. In this regard preferably the tape includes tonguelike portions or projections which project into a "transparency area" of each frame to assure that each transparency will be fixedly secured by the adhesive of the projections in its associated "transparency area." Moreover, due to the adhesive on both sides the tape, upon being folded upon itself, will assure that each pair of transparency frames is adhesively united to each other irrespective of any additional type of interlocking means between associated transversely adjacent transparency frames.

With the above and other objects in view that will hereinafter appear, the nature of the invention will be more clearly understood by reference to the following detailed description, the appended claims and the several views illustrated in the accompanying drawings.

IN THE DRAWING

Figure 1:
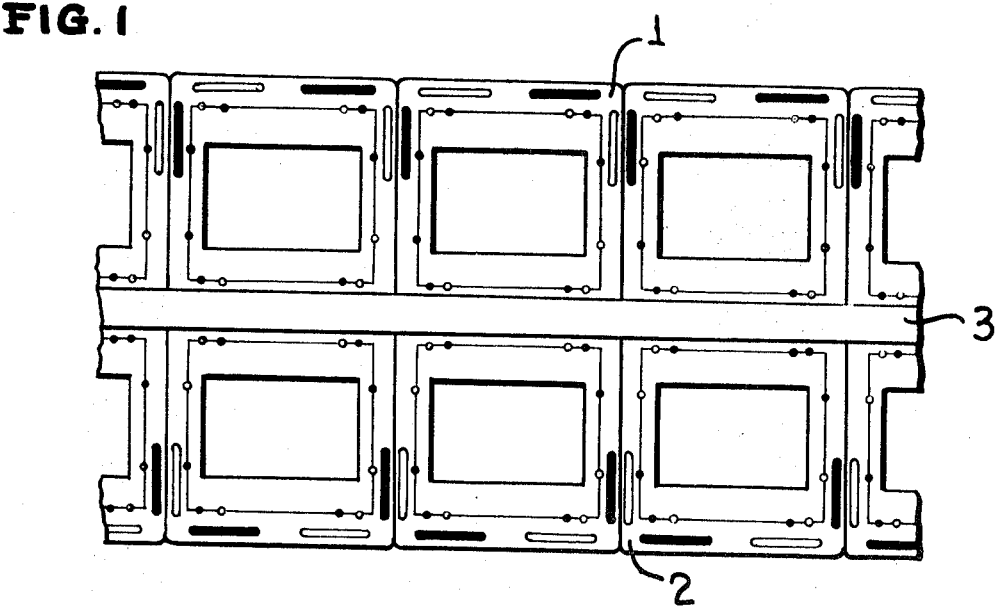
FIG. 1 is a top plan view looking downwardly toward the interior of a plurality of transparency frames forming a chain of transversely adjacent frames or frame halves united by a pliable tape or bandlike element.

Referring particularly to FIG. 1 of the drawing, a chain for feeding transparency frames to a processing and/or assembling machine includes bipartite transparency frames which consist of transversely adjacent frame elements or halves 1, 2 having adjacent sides (unnumbered) in intimate contiguous relationship. Each of the transparency frames or frame halves 1, 2 is illustrated in FIG. 1 with the inside thereof facing upwardly and there are three such pairs fully illustrated in this figure with two additional pairs being partially illustrated therein. Preferably, each frame element or half 1, 2 has suitable internal means to snap-fit transversely adjacent frames to each other. For example, the solid black circular and generally elongated elements of the uppermost frames are adapted when overfolded to align with like contoured elements of the lower frames which may be, for example, purely conventional snap-fitting projections and slots as is typical in plastic transparency frames forming no part of the present invention.

Each pair of transparency frames 1, 2 is joined to each other in the side-by-side relationship thereof by a plastic or similarly pliable tape 3 which has on its lower surface a suitable and preferably pressure-sensitive adhesive. The tape 3 runs in a longitudinal or horizontal direction as viewed in FIG. 1 across adjacent contiguous side edges of transversely adjacent frames 1, 2 and thus adheres transversely adjacent transparency frames 1, 2 to each other. In this manner a "chain" is formed to permit storage in rolled or similar form while permitting uniplanar feeding to a processing machine.

Figure 2:
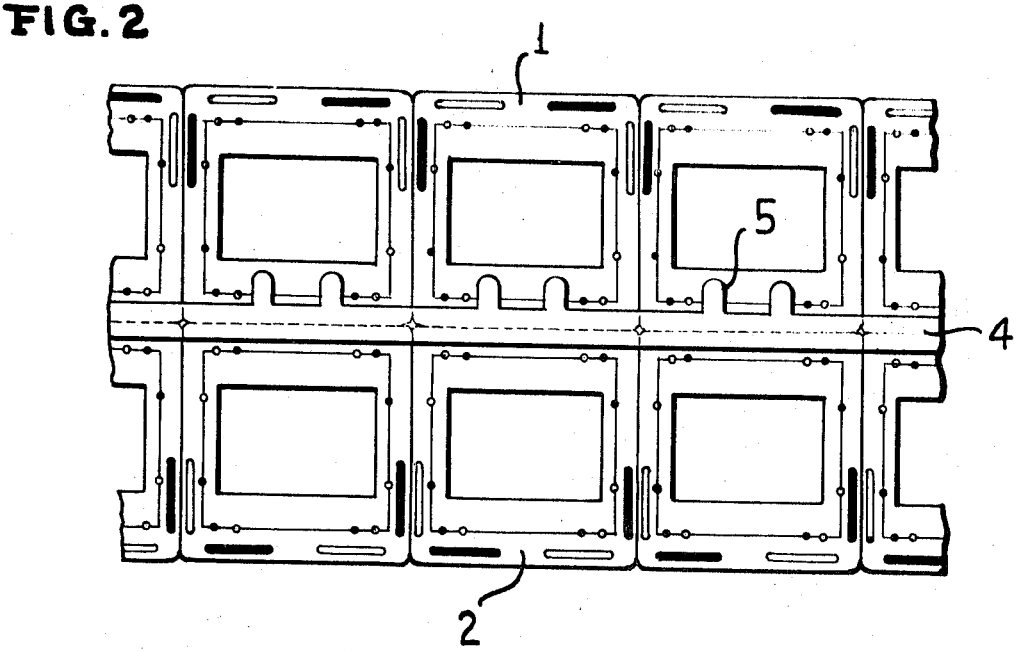
FIG. 2 is a top plan view of a similar chain of transparency frames corresponding to FIG. 1, but additionally includes a plurality of projections associated with the tape for fixedly securing a transparency relative to one frame of each pair of transversely adjacent transparency frames.

Reference is now made to FIG. 2 of the drawing which illustrates an embodiment of the invention quite similar to FIG. 1 except that the corresponding tape 4 is provided with an adhesive on both sides thereof. In addition, the tape 4 includes along one of its longitudinal edges a plurality of scallops or projections 5 which project into the "transparency area" of the uppermost transparency frames 1. The "transparency area" is merely a conventional recess or similarly delineated rectangular area in which each transparency or negative is adapted to be inserted and/or aligned. Thus, as each transparency is automatically or otherwise positioned relative to the frames 1, the projections 5 fixedly secure each transparency relative to an associated frame 1 and slippage therebetween is completely precluded. In this case the tape 4 is retained between each of the transparency halves 1, 2 when the same are overfolded upon each other whereas in the case of the chain of FIG. 1 the tape 3 may be, of course, removed without disturbing the transparencies associated with each transversely adjacent pair of frames 1, 2.

It is to be understood that the characteristics of the invention disclosed in the preceding description, in the drawing, and in the succeeding patent claims, can be essential both individually as well as in any desired combinations among one another for the realization of the invention in its various embodiments.

I claim:

1. A chain of transparency frames adapted to be fed to a processing machine comprising a plurality of transparency frames arranged in a plurality of transversely adjacent side-to-side contiguous pairs on opposite sides of a longitudinal centerline with longitudinally adjacent frames being in contiguous end-to-end relationship, means disposed along said longitudinal centerline uniting all of said transparency frames thereto in a chainlike fashion along side edge portions of said transparency frames, and said uniting means including means adjacent selected ones of said side edge portions for fixedly securing transparencies relative to selected ones of said transparency frames.

2. The chain of transparent frames as defined in claim 1 wherein said uniting means is a flexible element and the fixedly securing means thereof are adhesively coated projections projecting away from said longitudinal centerline.

3. The chain of transparency frames as defined in claim 1 wherein each frame includes an aperture having therebetween and said side and end edge portions a transparency area and said fixedly securing means includes adhesively coated portions of said uniting means disposed in said frame area.

4. A chain of transparency frames adapted to be fed to a processing machine comprising a plurality of transparency frames arranged in a plurality of transversely side-to-side contiguous pairs on opposite sides of a longitudinal centerline with longitudinally adjacent frames being in contiguous end-to-end relationship, flexible tape means disposed along said longitudinal centerline having adhesive means on one surface thereof uniting all of said transparency frames thereto along side edge portions thereof, and said flexible tape means further including adhesive means on an opposite side thereof for securing a transparency relative to at least one of each of the said transversely adjacent transparency frames whereby said transparencies are fixedly secured relative to said transparency frames upon the eventual overfolding of the transverse pairs of transparency frames relative to each other.